Patented June 9, 1925.

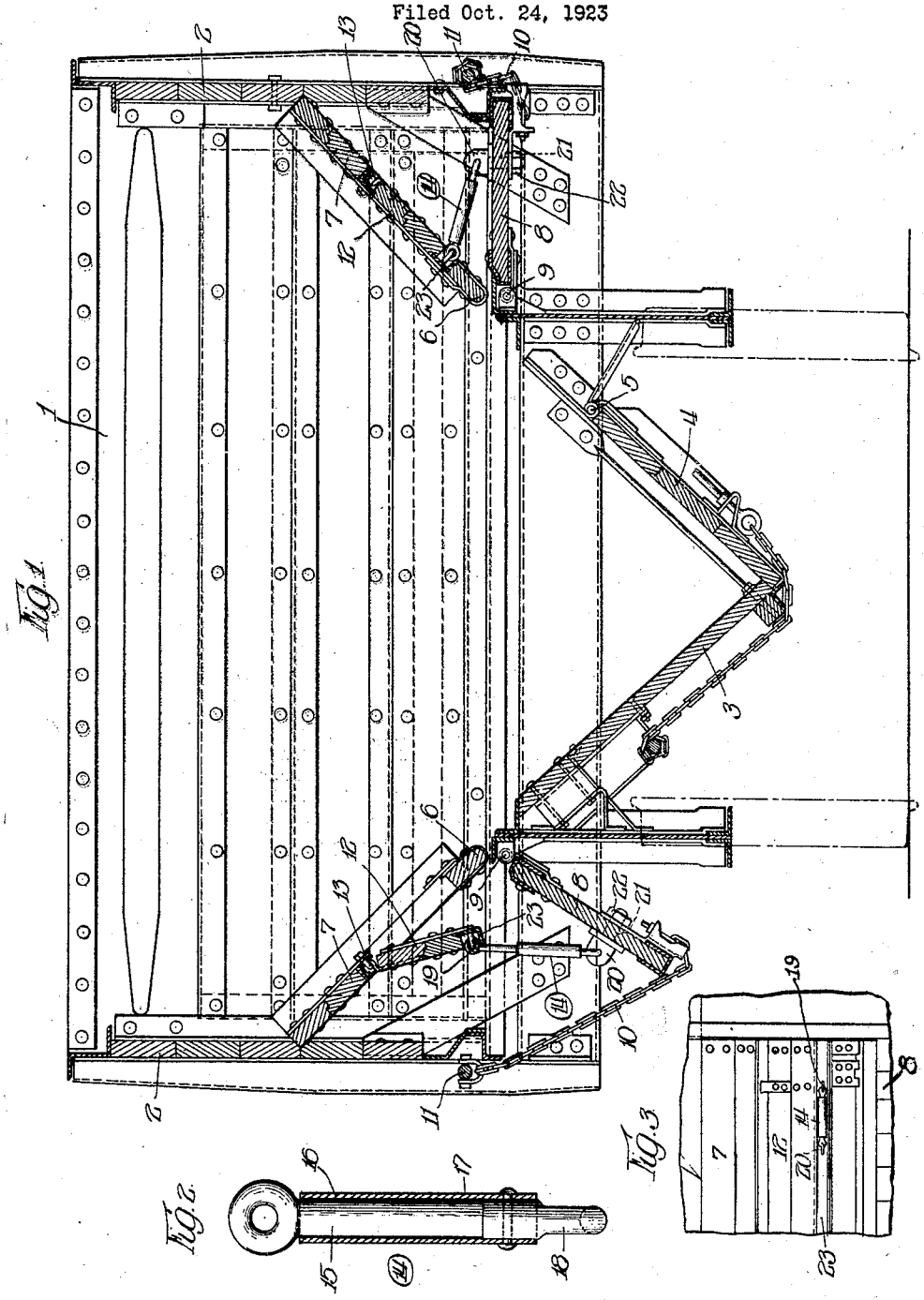

1,540,796

UNITED STATES PATENT OFFICE.

WILLIAM E. MOREY, OF CHICAGO, ILLINOIS, ASSIGNOR TO RODGER BALLAST CAR COMPANY, OF CHICAGO, ILLINOIS, A CORPORATION OF MAINE.

CAR CONSTRUCTION.

Application filed October 24, 1923. Serial No. 670,422.

*To all whom it may concern:*

Be it known that I, WILLIAM E. MOREY, a citizen of the United States, residing at Chicago, in the county of Cook and State of Illinois, have invented certain new and useful Improvements in Car Constructions, of which the following is a specification.

The present invention relates to car construction.

More particularly the present invention relates to the type of car construction which is known as a convertible car, that is, a car which may be selectively used as a flat bottom car or as a hopper car.

The present invention has for one of its objects the provision of a structure of the kind referred to, in which dumping may be readily accomplished either between the car tracks or to either side thereof.

A further object is to provide a combined flat bottom car and hopper bottom car in which, when the car is being used as a hopper bottom car, a flow of material may be readily controlled to a position between the tracks or to positions outside of the tracks.

A further object is to provide a sturdy construction of convertible car in which the flow of dumpable material may be readily controlled.

A further object is to provide a sturdy car of convertible type in which the operating mechanism for controlling the dumping of lading is readily accessible but which does not interfere with the use of the car as a flat bottom car.

Further objects will appear as the description proceeds.

Referring to the drawings—

Figure 1 is a transverse sectional view illustrating one embodiment of the present invention;

Figure 2 is a detailed enlarged view of a strut construction used in the car shown in Figure 1; and Figure 3 is a top plan view of a portion of the car when said car is being used as a flat bottom car, showing the disposal of the link illustrated in Figure 2.

The numeral 1 indicates a car of the convertible type, said car being provided with the side walls 2, 2, and with the sloping bottom wall 3 and dump door 4, which dump door 4 is pivoted along the axis 5 placed longitudinally of the car.

Pivoted about the axes indicated by the numerals 6, 6 are the bottom doors 7, 7 which are adapted to assume sloping positions adjacent to the side walls 2, 2, thereby becoming sloping walls to form a hopper with the bottom wall 3 and dump door 4. Each of the bottom doors 7, 7 is adapted to be swung about its axis 6 from its corresponding side wall 2 to a horizontal position, whereby to form part of a substantially flat bottom.

Arranged outside of the vertical planes containing the axes of the doors 7, 7 are the doors 8, 8, said doors being pivoted about the axes 9, 9. At the left hand side of Figure 1, one of said doors is shown in open position, at the right hand side of Figure 1, one of said doors is shown in closed position. An operating chain 10 may be provided for each of the doors 8, 8, each of said chains being operated from a longitudinally disposed shaft 11. It will be clear from the drawing that the doors 8, 8 may be moved to open or closed position in response to movement of the shafts 11, 11.

Each of the bottom doors 7, 7 is provided with an intermediate door 12, said intermediate doors being hinged about the axes 13, 13. When the doors 7, 7 are in sloping position, as indicated in Figure 1, the intermediate doors 12, 12 are adapted to swing downwardly to permit the passage of lading from the car past said intermediate doors 12, 12. For the purpose of controlling the operation of the doors 12, 12 each of said intermediate doors is provided with a telescoping strut 14, one end of each of said struts being connected to the swinging portion of one of the intermediate doors 12, the other end of said strut being connected to a corresponding door 8.

The strut 14, as shown in Figure 2, comprises a pair of telescoping members 15 and 16. The member 15 is illustrated as an eyebolt, while the member 16 is illustrated as being made up of a sleeve 17 having fixed thereto the eyebolt 18. Said eyebolts 15 and 18 are adapted to have abutting relation with one another within the sleeve 17. The strut 14 should be so designed that when the door 8, to which it is attached, is moved to closed or nearly closed position, the intermediate door 12 will be moved to closed position by reason of the abutting relation between the two eyebolts 15 and 18. No means of adjustment between eyebolts 15 and 18 has been illustrated, but means suitable for the purpose may be provided by those skilled in the art if adjustment should be found necessary.

The eyebolt 15 is shown in Figure 1 as being connected to its corresponding intermediate door 12 by means of the U-bolt 19. The eyebolt 18 may be connected to its corresponding door 8 through a hook 20 which may be closed up after said eyebolt is attached. Said hook 20 may have a screw threaded shank 21 for the reception of a nut 22.

Each of the doors 12 is provided along its swinging edge with a groove provided by the angle 23, said groove being located on the under-side of the door when the corresponding door 7 is in its inclined position, as illustrated in Figure 1. When the car is to be used with the doors 7, 7 in horizontal position the strut 14 and hook 20 may be disconnected from the door 8 by the removal of the nut 22. When the door 7 is swung about its axis into a horizontal position the groove 23 will be upwardly presented and will provide space for the reception of said strut 14 and hook 20 as shown in Figure 3. It will be clear that the strut 14 and hook 20 when lying in the groove 23 will not interfere with the use of the car as a flat bottom car. The shank 21 of hook 20 may extend through a hole in angle 23, the nut 22 being applied thereto, to maintain strut 14 within the groove provided by angle 23.

It will be clear without detailed explanation that when it is desired to use the car as a hopper car, the bottom doors 7, 7 will be moved into engagement with the side walls 2, 2 in the manner shown in Figure 1. When it is desired to dump the lading between the tracks the dump door 4 will be operated by mechanism which is well understood by those skilled in the art and which need not be referred to specifically herein. When it is desired to dump lading to the outside of the tracks, the corresponding shaft 11 will be operated to permit the opening of the corresponding door 8. Lowering of the door 8 will permit the opening of the corresponding intermediate door 12 whereby lading will be permitted to flow past said intermediate door. The door 8 will deflect the lading to a position clear of the tracks. The amount of lading permitted to pass the door 12 may be closely regulated by manipulation of the corresponding shaft 11. At such times that dumping to the sides of the tracks is not desired, the door 8 will be in its substantially horizontal position whereby the link 14 will hold the intermediate door 12 securely in closed position.

When it is desired to use the car as a flat bottom car, the links 14 and hooks 20 will be disconnected from the doors 8, 8 by the simple removal of the nuts 22, 22. After the doors 7, 7 have been swung away from the walls 2, 2 into horizontal positions, said links 14, 14 and hooks 20, 20 will be located in the grooves 23, 23 whereby to be out of the way, all as explained hereinabove. At this time, of course, the doors 8, 8 will be held in their horizontal positions, that is, the position of the right-hand door 8, as viewed in Figure 1.

One embodiment of the present invention has been described in detail. Various modifications will occur to those skilled in the art. It is intended in this patent to cover all such modifications as fall within the scope of the invention as defined by the appended claims.

I claim:

1. A convertible car having members providing a hopper for dumping between the tracks, swinging bottom walls adapted to occupy positions forming hopper walls or horizontal positions to form part of a substantially flat bottom, a second set of swinging bottom walls placed outwardly of the vertical planes containing the axes of rotation of said first mentioned swinging bottom walls, said latter swinging bottom walls being provided with intermediate swinging doors, and telescoping struts connecting the swinging edges of said intermediate swinging doors with said second set of bottom walls.

2. A convertible car comprising members forming a hopper for dumping between the tracks, swinging bottom walls each adapted to selectively occupy a horizontal position or an inclined position for deflecting lading to said hopper, each of said swinging bottom walls being provided with an intermediate door for permitting lading to pass from said car outwardly of the tracks and a second set of swinging bottom walls, each having a longitudinal axis spaced from the corresponding side of said car and having its swinging edge adapted to move into proximity to the corresponding side of said car and a pair of telescoping struts each connecting the swinging edge of one of said intermediate doors with one of said second set of bottom walls.

3. A convertible car construction comprising a swinging bottom member adapted to occupy a horizontal position or an inclined sloping position above its horizontal position, a second bottom member adapted to occupy a horizontal position or an inclined sloping position below its horizontal position, said first mentioned bottom member being provided with an intermediate door adapted to swing downwardly when said first mentioned bottom wall is in inclined position, and a telescoping strut connecting said swinging door with said second mentioned bottom member for holding said intermediate door in closed position when said second mentioned bottom member is in substantially horizontal position and for permitting the opening of said intermediate door when said second mentioned bottom member is in inclined position.

4. In a convertible car, a pair of bottom walls located on the same side of the longitudinal center line of said car adapted to simultaneously occupy horizontal positions to form parts of a flat bottom and being adapted to simultaneously occupy sloping positions when it is desired to operate said car as a hopper car, one of said above walls having a door therein and an extensible strut connecting said door with the other of said bottom walls.

5. In a convertible car, a pair of bottom walls located on the same side of the longitudinal center line of said car adapted to simultaneously occupy horizontal positions to form parts of a flat bottom and being adapted to simultaneously occupy sloping positions when it is desired to operate said car as a hopper car, one of said above walls having a door therein and an extensible strut connecting said door with the other of said bottom walls, said strut being readily separable from one of said bottom walls, the other of said bottom walls being provided with a pocket for receiving said strut when said strut is not in use.

6. In convertible car construction, a pair of adjacent bottom walls adapted to occupy horizontal positions on two sides of a longitudinal vertical plane and adapted to occupy inclined positions on a single side of the same plane, one of said bottom walls being provided with a door therein, and means connected with said door and with the other of said bottom walls for controlling said door and said other bottom wall in unison, said means comprising an extensible strut for forcing said door to closed position upon operation of said other door in a predetermined direction.

Signed at Chicago, Illinois, this 10th day of Oct., 1923.

WILLIAM E. MOREY.